(12) United States Patent
Lee et al.

(10) Patent No.: US 9,744,840 B2
(45) Date of Patent: Aug. 29, 2017

(54) POWER TRANSMISSION APPARATUS FOR VEHICLE

(71) Applicant: Hyundai Motor Company, Seoul (KR)

(72) Inventors: Kyeonghun Lee, Seoul (KR); Jongmin Kim, Hwaseong-si (KR); Jongsool Park, Hwaseong-si (KR); Byunghyun Lee, Gunpo-si (KR); Suengho Lee, Seoul (KR); Seongwook Hwang, Gunpo-si (KR); Minjun Song, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 14/539,838

(22) Filed: Nov. 12, 2014

(65) Prior Publication Data

US 2015/0165888 A1    Jun. 18, 2015

(30) Foreign Application Priority Data

Dec. 18, 2013  (KR) .................... 10-2013-0158811

(51) Int. Cl.

| F16H 3/72 | (2006.01) |
|---|---|
| B60K 6/365 | (2007.10) |
| B60K 6/547 | (2007.10) |
| B60K 6/48 | (2007.10) |
| F16H 3/00 | (2006.01) |
| F16H 3/093 | (2006.01) |

(52) U.S. Cl.
CPC .............. B60K 6/365 (2013.01); B60K 6/48 (2013.01); B60K 6/547 (2013.01); *F16H 3/006* (2013.01); *F16H 3/725* (2013.01); *F16H 2003/0931* (2013.01); *F16H 2200/0043* (2013.01); *Y02T 10/6221* (2013.01)

(58) Field of Classification Search
None
See application file for complete search history.

(56) References Cited

U.S. PATENT DOCUMENTS

| 2010/0125020 A1 | 5/2010 | Ikegami et al. |
| 2013/0109530 A1* | 5/2013 | Kaltenbach ............ B60K 6/387 477/5 |

FOREIGN PATENT DOCUMENTS

| EP | 2 189 318 B1 | 6/2012 |
| JP | 2004-239441 A | 8/2004 |

(Continued)

*Primary Examiner* — Erin D Bishop
(74) *Attorney, Agent, or Firm* — Morgan, Lewis & Bockius LLP (57) ABSTRACT

A power transmitting apparatus may include a first input shaft to selectively receive torque of an engine, a second input shaft to selectively receive the torque of the engine and having at least one input gear, a third input shaft selectively connected to the second input shaft and having at least one input gear, a motor/generator operated as a motor or a generator, a planetary gear set including a first rotation element directly connected to the motor/generator, a second rotation element directly connected to the third input shaft, and a third rotation element directly connected to the first input shaft, a first speed output unit adapted to convert torque input from the second input shaft or the third input shaft and output the converted torque, and a second speed output unit to convert torque input from the second input shaft or the third input shaft and output the converted torque.

18 Claims, 2 Drawing Sheets

(56) References Cited

FOREIGN PATENT DOCUMENTS

JP        4361794 B2    11/2009
JP     2010-510449 A     4/2010

\* cited by examiner

| Speed | CL1 | CL2 | CL3 | CL4 | SL1 | | SL2 | | SL3 | Note |
|---|---|---|---|---|---|---|---|---|---|---|
| | | | | | 1st | 4th | 2nd | REV | 3rd | |
| Neutral | | | | | ● | | | | | Engine ON |
| D1 | (●) | ● | ● | | ● | | | | | |
| D2 | (●) | ● | | | | | ● | | | |
| D3 | (●) | ● | ● | | | | | | ● | |
| D4 | (●) | ● | | | | ● | | | | |
| HEV D1 | ● | | | | ● | | | | | Engine ON, motor ON |
| HEV D2 | ● | | | | | | | | ● | |
| HEV REV | ● | | | | | | | ● | | |
| EV D1 | | | | ● | ● | | | | | Engine OFF, motor ON |
| EV D2 | | | ● | ● | | | ● | | | |
| EV D3 | | | | ● | | | | | ● | |
| EV D4 | | | ● | ● | | ● | | | | |

● : Operating    (●) : Operating if necessary

POWER TRANSMISSION APPARATUS FOR VEHICLE

CROSS-REFERENCE TO RELATED APPLICATION

The present application claims priority to Korean Patent Application No. 10-2013-0158811 filed on Dec. 18, 2013, the entire contents of which is incorporated herein for all purposes by this reference.

BACKGROUND OF THE INVENTION

Field of the Invention

The present invention relates to a power transmitting apparatus for a vehicle. More particularly, the present invention relates to a power transmitting apparatus for a vehicle that realizes smooth start and quick shift by adding a motor/generator and a planetary gear set to a double clutch transmission motor/generator and improves fuel economy by realizing regenerative braking and start charging.

Description of Related Art

Environmentally-friendly technique of vehicles is very important technique on which survival of future motor industry is dependent. Vehicle makers are focusing on development of environmentally-friendly vehicles to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system to meet exhaust regulation of countries and improve fuel consumption performance. To improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of realizing smooth start and quick shift by adding a motor/generator and a planetary gear set to a double clutch transmission motor/generator and improving fuel economy by realizing regenerative braking and start charging.

In addition, various aspects of the present invention are directed to providing a power transmitting apparatus for a vehicle having further advantages of improving driving safety by enabling of shifting even though a motor/generator cannot operate.

A power transmitting apparatus for a vehicle according to an exemplary embodiment of the present invention may include, a first input shaft adapted to selectively receive torque of an engine, a second input shaft disposed without rotational interference with the first input shaft, adapted to selectively receive the torque of the engine, and having at least one input gear fixedly disposed thereon, a third input shaft disposed in a row with the second input shaft and without rotational interference with the first input shaft, selectively connected to the second input shaft, and having at least one input gear fixedly disposed thereon, a motor/generator operated as a motor or a generator, a planetary gear set including a first rotation element directly connected to the motor/generator, a second rotation element directly connected to the third input shaft, and a third rotation element directly connected to the first input shaft, a first speed output unit adapted to convert torque input from the second input shaft or the third input shaft and output a converted torque, and, a second speed output unit adapted to convert torque input from the second input shaft or the third input shaft and output a converted torque.

At least one input gear fixedly disposed on the second input shaft may be related to achieving even-numbered speeds, and at least one input gear fixedly disposed on the third input shaft may be related to achieving odd-numbered speeds including a reverse speed.

A first input gear for achieving a fourth forward speed and a second input gear for achieving a second forward speed may be fixedly disposed on the second input shaft, and a third input gear for achieving a first forward speed or the reverse speed and a fourth input gear for achieving a third forward speed may be fixedly disposed on the third input shaft.

The planetary gear set may be a single pinion planetary gear set, wherein the first rotation element is a sun gear, the second rotation element is a planet carrier, and the third rotation element is a ring gear.

The power transmitting apparatus may further include, a first clutch selectively connecting the engine to the first input shaft, a second clutch selectively connecting the engine to the second input shaft, and a third clutch selectively connecting the second input shaft to the third input shaft.

The first speed output unit may include, a first output shaft disposed in parallel with the second and third input shafts, at least one speed gear engaged with the at least one input gear on the first input shaft or the second input shaft and rotatably disposed on the first output shaft, a first synchronizer disposed on the first output shaft and selectively connecting the at least one speed gear to the first output shaft, and a first output gear fixedly disposed on the first output shaft and outputting torque of the first output shaft.

A first speed gear engaged with the third input gear and a fourth speed gear engaged with the first input gear may be rotatably disposed on the first output shaft.

The second speed output unit may include, a second output shaft disposed in parallel with the second and third input shafts, at least one speed gear engaged with the at least one input gear on the first input shaft or the second input shaft and rotatably disposed on the second output shaft. second and third synchronizers disposed on the second output shaft and selectively connecting the at least one speed gear to the second output shaft, and a second output gear fixedly disposed on the second output shaft and outputting torque of the second output shaft.

The second synchronizer may selectively connect a second speed gear or a reverse speed gear engaged with the second input gear to the second output shaft.

The third synchronizer may selectively connect a third speed gear engaged with the fourth input gear to the second output shaft.

The power transmitting apparatus may further include a fourth clutch selectively connecting the first rotation element of the planetary gear set to the third input shaft.

The power transmitting apparatus may further include a reverse speed generator disposed in parallel with the second speed output unit and adapted to achieve the reverse speed.

The reverse speed generator may include, an idle shaft disposed in parallel with the second speed output unit, and a reverse idle gear engaged to the third input gear on the third input shaft and the reverse speed gear on the second output shaft.

Each of the second input shaft and the third input shaft may be a hollow shaft, and the first input shaft may penetrate simultaneously through the second input shaft and the third input shaft.

A power transmitting apparatus for a vehicle according to another exemplary embodiment of the present invention may include, a first input shaft adapted to selectively receive torque of an engine, a second input shaft disposed without rotational interference with the first input shaft, adapted to selectively receive the torque of the engine, and having at least one input gear fixedly disposed thereon, a third input shaft disposed in a row with the second input shaft and without rotational interference with the first input shaft, selectively connected to the second input shaft, and having at least one input gear fixedly disposed thereon, a motor/generator operated as a motor or a generator, a planetary gear set including a first rotation element directly connected to the motor/generator, a second rotation element directly connected to the third input shaft, and a third rotation element directly connected to the first input shaft, a first clutch selectively connecting the engine to the first input shaft, a second clutch selectively connecting the engine to the second input shaft, a third clutch selectively connecting the second input shaft to the third input shaft, a fourth clutch selectively connecting the first rotation element of the planetary gear set to the third input shaft, a first speed output unit adapted to convert torque input from the second input shaft or the third input shaft and output a converted torque, a second speed output unit adapted to convert torque input from the second input shaft or the third input shaft and output a converted torque, and a reverse speed generator disposed in parallel with the second speed output unit and adapted to achieve the reverse speed.

A first input gear for achieving a fourth forward speed and a second input gear for achieving a second forward speed may be fixedly disposed on the second input shaft, and a third input gear for achieving a first forward speed or the reverse speed and a fourth input gear for achieving a third forward speed may be fixedly disposed on the third input shaft.

The planetary gear set may be a single pinion planetary gear set, wherein the first rotation element is a sun gear, the second rotation element is a planet carrier, and the third rotation element is a ring gear.

The first speed output unit may include, a first output shaft disposed in parallel with the second and third input shafts, a first speed gear engaged with the third input gear and rotatably disposed on the first output shaft, a fourth speed gear engaged with the first input gear and rotatably disposed on the first output shaft, a first synchronizer selectively connecting the first speed gear or the fourth speed gear to the first output shaft, and, a first output gear fixedly disposed on the first output shaft and outputting torque of the first output shaft.

The second speed output unit may include, a second output shaft disposed in parallel with the second and third input shafts, a second speed gear engaged with the second input gear and rotatably disposed on the second output shaft, a third speed gear engaged with the fourth input gear and rotatably disposed on the second output shaft, a reverse speed gear rotatably disposed on the second output shaft, a second synchronizer selectively connecting the second speed gear or the reverse speed gear to the second output shaft, a third synchronizer selectively connecting the third speed gear to the second output shaft, and, a second output gear fixedly disposed on the second output shaft and outputting torque of the second output shaft.

The reverse speed generator may include, an idle shaft disposed in parallel with the second speed output unit, and, a reverse idle gear engaged to the third input gear on the third input shaft and the reverse speed gear on the second output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which is/are included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
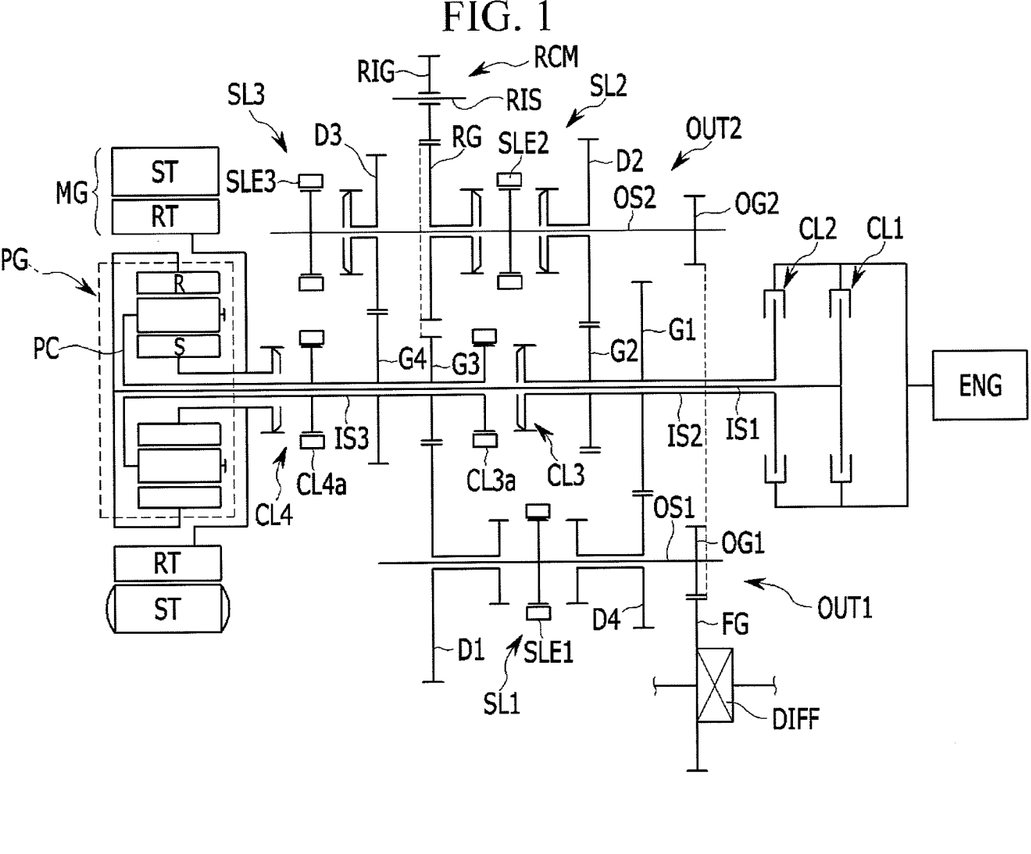
FIG. 1 is a schematic diagram of a power transmitting apparatus according to an exemplary embodiment of the present invention.

FIG. 1 is a schematic diagram of a power transmitting apparatus according to an exemplary embodiment of the present invention.

Referring to FIG. 1, a power transmitting apparatus according to an exemplary embodiment of the present invention includes first, second and third input shafts IS1, IS2, and IS3, a planetary gear set PG, a motor/generator MG, first, second, third, and fourth clutches CL1, CL2, CL3, and CL4, first and second speed output units OUT1 and OUT2, and a reverse speed generator RCM.

The first input shaft IS1 is selectively connected to an output side of an engine ENG.

The second input shaft IS2 is a hollow shaft and is disposed at a side portion of the first input shaft IS1 without rotational interference therebetween. The second input shaft IS2 is selectively connected to the output side of the engine ENG, and first and second input gears G1 and G2 are sequentially disposed on the second input shaft IS2 from a side portion to the other side portion.

The third input shaft IS3 is a hollow shaft and is disposed at the other side portion of the first input shaft IS1 without rotational interference therebetween. The third input shaft IS3 is selectively connected to the second input shaft IS2, and third and fourth input gears G3 and G4 are sequentially disposed on the third input shaft IS3 from a side portion to the other side portion.

The first, second, third, and fourth input gears G1, G2, G3, and G4 are input gears operating at each speed. That is, the first input gear G1 is an input gear for achieving a fourth forward speed, the second input gear G2 is an input gear for achieving a second forward speed, the third input gear G3 is an input gear for achieving a reverse speed or a first forward speed, and the fourth input gear G4 is an input gear for achieving a third forward speed.

Here, input gears for achieving even-numbered speeds are disposed on the second input shaft IS2, and input gears for achieving the reverse speed and odd-numbered speeds are disposed on the third input shaft IS3.

The planetary gear set PG is disposed at the other side portion of the third input shaft IS3 and includes three rotation elements. The first rotation element is directly connected to the motor/generator MG and is selectively connected to the third input shaft IS, the second rotation element is directly connected to the third input shaft IS3, and the third rotation element is directly connected to the first input shaft IS1.

The planetary gear set PG is a single pinion planetary gear set, the first rotation element is a sun gear S, the second rotation element is a planet carrier PC, and the third rotation element is a ring gear R.

The motor/generator MG can be operated as a motor or a generator and is disposed at a radial exterior of the planetary gear set PG.

In addition, the motor/generator MG includes a stator ST fixed to a transmission housing and a rotor RT rotatably supported in the stator ST. The rotor RT is directly connected to the sun gear S that is the first rotation element of the planetary gear set PG.

Therefore, the motor/generator MG may be operated as the generator using torque of the engine ENG and may charge a battery by generated electrical energy, or may be operated as the motor for generating driving torque.

The first clutch CL1 is disposed between the output side of the engine ENG and the first input shaft IS1, and selectively connects the first input shaft IS1 to the output side of the engine ENG.

The second clutch CL2 is disposed between the output side of the engine ENG and the second input shaft IS2, and selectively connects the second input shaft IS2 to the output side of the engine ENG.

The first and second clutches CL1 and CL2 are conventional multi-plate clutches of wet type and may be controlled by a hydraulic control system (not shown).

The third clutch CL3 is disposed between the other end portion of the second input shaft IS2 and one end portion of the third input shaft IS3, and selectively connects the second input shaft IS2 to the third input shaft IS3.

The fourth clutch CL4 selectively connects the sun gear S of the planetary gear set PG and the rotor RT of the motor/generator MG to the third input shaft IS3.

The third and fourth clutches CL3 and CL4 may be typical synchronizers.

Since the third and fourth clutches CL3 and CL4 are well known to a person of an ordinary skill in the art, detailed description thereof will be omitted. In addition, sleeves CL3a and CL4a applied respectively to the synchronizers, as well known to a person of an ordinary skill in the art, are operated by additional actuators (not shown) and the actuators are controlled by a transmission control unit.

The third and fourth clutches CL3 and CL4 may not be synchronizers and may be dog clutches or multi-plates clutches.

The first speed output unit OUT1 includes a first output shaft OS1 disposed in parallel with and apart from the second and third input shafts IS2 and IS3, first and fourth speed gears D1 and D4, and a first synchronizer SL1 selectively connecting the first speed gear D1 or the fourth speed gear D4 to the first output shaft OS1.

The first speed gear D1 is engaged to the third input gear G3 and the fourth speed gear D4 is engaged to the first input gear G1.

In addition, the torque converted by the first speed output unit OUT1 is transmitted to a differential apparatus DIFF through a first output gear OG1 fixedly disposed on one end portion or the other end portion of the first output shaft OS1 and a final reduction gear FG engaged with the first output gear OG1.

The second speed output unit OUT2 includes a second output shaft OS2 disposed in parallel with and apart from the second and third input shafts IS2 and IS3, second and third speed gears D2 and D3 and a reverse speed gear RG, a second synchronizer SL2 selectively connecting the second speed gear D2 or the reverse speed gear RG to the second output shaft OS2, and a third synchronizer SL3 selectively connecting the third speed gear D3 to the second output shaft OS2.

The second synchronizer SL2 is disposed at a side portion of the second output shaft OS2 and the third synchronizer SL3 is disposed at the other side portion of the second output shaft OS2.

The second speed gear D2 is engaged with the second input gear G2 and the reverse speed gear RG is connected to the third input gear G3 through the reverse speed generator RCM.

The third speed gear D3 is engaged with the fourth input gear G4.

In addition, the torque converted by the second speed output unit OUT2 is transmitted to the differential apparatus DIFF through a second output gear OG2 fixedly disposed on one end portion or the other end portion of the second output shaft IS2 and the final reduction gear FD engaged with the second output gear OG2.

Since the first, second, and third synchronizers SL1, SL2, and SL3 are well known to a person of an ordinary skill in the art, detailed description thereof will be omitted. In addition, first, second, and third sleeves SLE1, SLE2, and SLE3 applied respectively to the first, second and third synchronizers SL1, SL2, and SL3, as well known to a person of an ordinary skill in the art, are operated by additional actuators (not shown) and the actuators are controlled by a transmission control unit.

The reverse speed generator RCM includes an idle shaft RIS disposed in parallel with the third input shaft IS3 and the second output shaft OS2, and a reverse idle gear RIG engaged with the third input gear G3 on the third input shaft IS3 and the reverse speed gear RG on the second output shaft OS1 and rotatably disposed on the idle shaft RIS.

The reverse idle gear RIG changes positive torque of the third input gear G3 into negative torque and transmits the negative torque to the reverse speed gear RG. Therefore, the reverse speed can be achieved.

Figure 2:
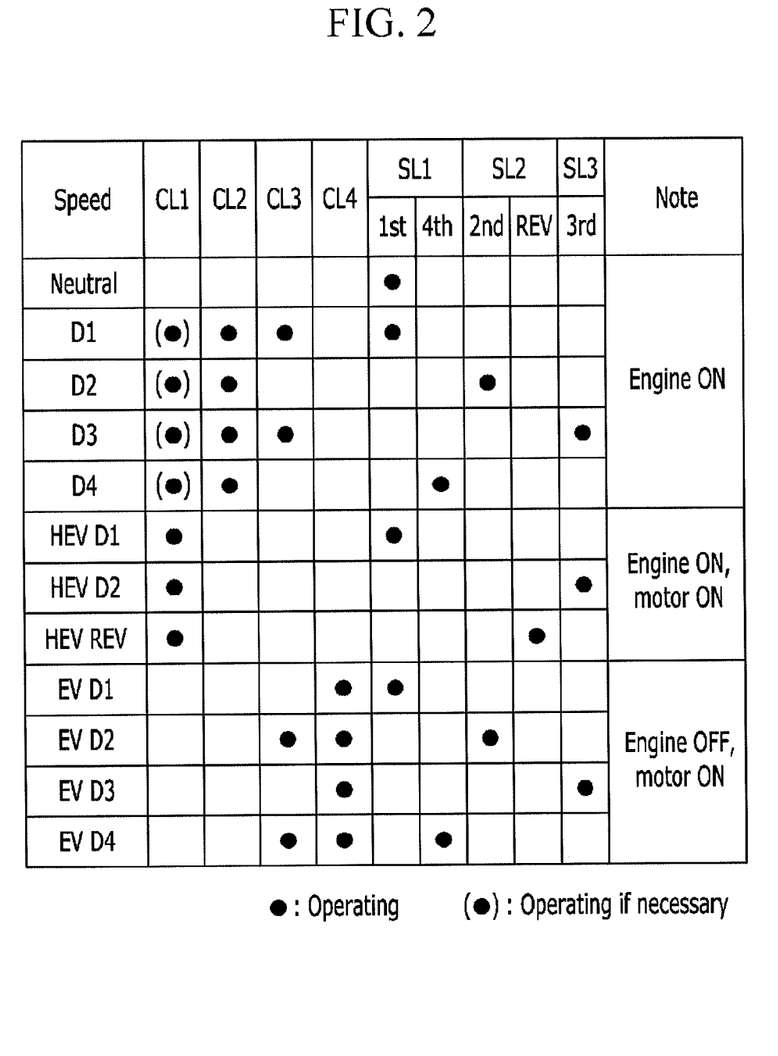
FIG. 2 is an operational chart of a power transmitting apparatus according to an exemplary embodiment of the present invention.

FIG. 2 is an operational chart of a power transmitting apparatus according to an exemplary embodiment of the present invention.

[Neutral]

If neutral is maintained in a state that the engine is started, the first speed gear D1 is operably connected to the first output shaft OS1 through the first sleeve SLE1 of the first synchronizer SL1 and any clutch is not operated.

[First Forward Speed]

The first speed gear D1 is operably connected to the first output shaft OS1 through the first sleeve SLE1 of the first synchronizer SL1, and the second input shaft IS2 is operably connected to the third input shaft IS3 through the sleeve CL3 of the third clutch CL3a at the first forward speed. After that, if the second clutch CL2 is operated, the first forward speed is achieved.

Therefore, the torque of the engine ENG is transmitted to the final reduction gear FG through the second clutch CL2, the second input shaft IS2, the third clutch CL3, the third input shaft IS3, the third input gear G3, the first speed gear D1, the first output shaft OS1, and the first output gear OG1.

[Second Forward Speed]

If vehicle speed increases at the first forward speed and a shift to the second forward speed is necessary, the sleeve CL3 of the third clutch CL3a is released so as to disconnect the second input shaft IS2 from the third input shaft IS3 and the second clutch CL2 is released.

In addition, after the second speed gear D2 is operably connected to the second output shaft OS2 through the second sleeve SLE2 of the second synchronizer SL2, the second clutch C2 is operated again.

In this case, the torque of the engine ENG is transmitted to the final reduction gear FG through the second clutch CL2, the second input shaft IS2, the second input gear G2, the second speed gear D2, the second output shaft OS2, and the second output gear OG2.

[Third Forward Speed]

If the vehicle speed increases at the second forward speed and a shift to the third forward speed is necessary, the second clutch CL2 is released and the second sleeve SLE2 of the second synchronizer SL2 moves to a neutral position. In addition, after the third speed gear D3 is operably connected to the second output shaft OS2 through the third sleeve SLE3 of the third synchronizer SL3, the third clutch CL3 and the second clutch CL2 are operated.

In this case, the torque of the engine ENG is transmitted to the final reduction gear FG through the second clutch CL2, the second input shaft IS2, the third clutch CL3, the third input shaft IS3, the fourth input gear G4, the third speed gear D3, the second output shaft OS2, and the second output gear OG2.

[Fourth Forward Speed]

If the vehicle speed increases at the third forward speed and a shift to the fourth forward speed is necessary, the sleeve CL3 of the third clutch CL3a is released so as to disconnect the second input shaft IS2 from the third input shaft IS3 and the second clutch CL2 is released.

In addition, after the fourth speed gear D4 is operably connected to the first output shaft OS1 through the first sleeve SLE1 of the first synchronizer SL1, the second clutch C2 is operated again.

In this case, the torque of the engine ENG is transmitted to the final reduction gear FG through the second clutch CL2, the second input shaft IS2, the first input gear G1, the fourth speed gear D4, first output shaft OS1, and the first output gear OG1.

In addition, after the shift to the fourth forward speed is completed, the third synchronizer SL3 moves to a neutral position.

If the power transmitting apparatus according to the exemplary embodiment of the present invention performs an automated manual shift, pre-shift for raising or lowering speeds sequentially may not be possible because the second and third input shafts IS2 and IS3 are simultaneously rotated at the odd-numbered speeds.

In addition, the power transmitting apparatus according to the exemplary embodiment of the present invention can achieve two forward speeds and one reverse speed at a hybrid electric vehicle (HEV) mode.

Since both of the engine ENG and the motor/generator MG are operated at the HEV mode, only the speeds related to the third input shaft IS3 can be achieved.

[First HEV Speed]

After the first speed gear D1 is operably connected to the first output shaft OS1 through the first sleeve SLE1 of the first synchronizer SL1, the first clutch CL1 is operated and the motor/generator MG is driven at a first HEV speed.

In this case, the torque of the engine ENG is input to the ring gear R and the torque of the motor/generator MG is input to the sun gear S. Therefore, the torques of the engine ENG and the motor/generator MG are transmitted to the third input shaft IS3.

In addition, the torque of the third input shaft IS3 is changed according to gear ratios of the third input gear G3 and the first speed gear D1, and is then transmitted to the final reduction gear FG through the first output shaft OS1 and the first output gear OG1.

[Second HEV Speed]

If the vehicle speed increases at the first HEV speed and a shift to a second HEV speed is necessary, the first clutch C1 is released and the first synchronizer SL1 returns to a neutral position. In addition, the third speed gear D3 is operably connected to the second output shaft OS2 through the third sleeve SLE3 of the third synchronizer SL3 and the first clutch C1 is operated again.

In this case, the torque of the third input shaft IS3 is changed according to gear ratios of the fourth input gear G4 and the third speed gear D3, and is then transmitted to the final reduction gear FG through the second output shaft OS2 and the second output gear OG2.

[HEV Reverse Speed]

In a state that the engine ENG is started, the reverse speed gear RG is operably connected to the second output shaft OS2 through the second sleeve SLE2 of the second synchronizer SL2 at an HEV reverse speed. In addition, the first clutch CL1 is operated and the motor/generator MG is driven.

In this case, since the torque of the engine is input to the ring gear R and the torque of the motor/generator MG is input to the sun gear S, the torques of the engine ENG and the motor/generator MG are transmitted to the third input shaft IS3.

In addition, the torque of the third input shaft IS3 is transmitted to the final reduction gear FG through the third input gear G4, the reverse idle gear RIG, the reverse speed gear RG, the second output shaft OS2, and the second output gear OG2.

In addition, the power transmitting apparatus according to the exemplary embodiment of the present invention can achieve four forward speeds at an electric vehicle (EV) mode.

The vehicle is driven only by the driving torque of the motor/generator MG at the EV mode.

[First EV Speed]

After the first speed gear D1 is operably connected to the first output shaft OS1 through the first sleeve SLE1 of the first synchronizer SL1, the fourth clutch CL4 is operated at a first EV speed.

In this case, the planetary gear set PG becomes a direct-coupling state and the driving torque of the motor/generator MG is transmitted to the final reduction gear FG through the third input shaft IS3, the third input gear G3, the first speed gear D1, the first output shaft OS1, and the first output gear OG1.

[Second EV Speed]

If the vehicle speed increases at the first EV speed and a shift to a second EV speed is necessary, the fourth clutch CL4 is released and the first synchronizer SL1 moves to the neutral position. In addition, after the second speed gear D2 is operably connected to the second output shaft OS2 through the second sleeve SLE2 of the second synchronizer SL2, the fourth clutch CL4 is operated again and the third clutch CL3 is operated.

In this case, the torque of the third input shaft IS3 is transmitted to the final reduction gear FG through the third clutch CL3, the second input shaft IS2, the second input gear G2, the second speed gear D2, the second output shaft OS2, and the second output gear OG2.

[Third EV Speed]

If the vehicle speed increases at the second EV speed and a shift to a third EV speed is necessary, the third and fourth clutches CL3 and CL4 are released and the second synchronizer SL2 moves to the neutral position. In addition, after the third speed gear D3 is operably connected to the second output shaft OS2 through the third sleeve SLE3 of the third synchronizer SL3, the fourth clutch CL4 is operated again.

In this case, the torque of the third input shaft IS3 is transmitted to the final reduction gear FG through the fourth input gear G4, the third speed gear D3, the second output shaft OS2, and the second output gear OG2.

[Fourth EV Speed]

If the vehicle speed increases at the third EV speed and a shift to a fourth EV speed is necessary, the fourth clutch C4 is released and the third synchronizer SL3 moves to the neutral position. In addition, after the fourth speed gear D4 is operably connected to the first output shaft OS1 through the first sleeve SLE1 of the first synchronizer SL1, the fourth clutch CL4 is operated again and the third clutch CL3 is operated.

In this case, the torque of the third input shaft IS3 is transmitted to the final reduction gear FG through the third clutch CL3, the second input shaft IS2, the first input gear G1, the fourth speed gear D4, the first output shaft OS1, and the first output gear OG1.

The power transmitting apparatus for a vehicle according to the exemplary embodiment of the present invention can achieve four forward speeds by the torque of the engine, achieve two HEV forward speeds and one HEV reverse speed by the torque of the engine and the torque of the motor/generator, and achieve four EV forward speeds by the torque of the motor/generator. Therefore, fuel economy may be enhanced.

In addition, smooth starting may be performed without slip of friction members by the engine and the motor/generator connected respectively to rotation elements of the planetary gear set. In addition, starting is possible only by the motor/generator in a state that the engine is stopped.

Since the slip of the friction members does not occur when starting, durability of the friction members may be improved, energy loss may be minimized, and fuel economy may be enhanced.

Since shift is executed not by slip of the friction members but by the motor/generator, smooth shift may be possible.

In addition, when the vehicle runs by the torque of the engine, the motor/generator can supply auxiliary torque. Therefore, acceleration performance may be improved.

Since the power transmitting apparatus can be operated as a typical double clutch transmission if the motor/generator is out of order, driving safety of the vehicle may be secured.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle comprising:
   a first input shaft adapted to selectively receive torque of an engine;
   a second input shaft, adapted to selectively receive the torque of the engine, and having at least one input gear fixedly disposed thereon;
   a third input shaft disposed in a row with the second input shaft, selectively connected to the second input shaft, and having at least one input gear fixedly disposed thereon;
   a motor/generator operated as a motor or a generator;
   a planetary gear set including a first rotation element directly connected to the motor/generator, a second rotation element directly connected to the third input shaft, and a third rotation element directly connected to the first input shaft;
   a first output shaft receiving torque input from the second input shaft or the third input shaft; and
   a second output shaft receiving torque input from the second input shaft or the third input shaft,
   wherein the at least one input gear fixedly disposed on the second input shaft comprises a first input gear for achieving a fourth forward speed, and a second input gear is fixedly disposed on the second input shaft for achieving a second forward speed, and
   the at least one input gear fixedly disposed on the third input shaft comprises a third input gear for achieving a first forward speed or a reverse speed, and a fourth input gear is disposed on the third input shaft for achieving a third forward speed.

2. The power transmitting apparatus of claim 1, wherein the at least one input gear fixedly disposed on the second input shaft is related to achieving even-numbered speeds, and
   the at least one input gear fixedly disposed on the third input shaft is related to achieving odd-numbered speeds including a reverse speed.

3. The power transmitting apparatus of claim 1, wherein the planetary gear set is a single pinion planetary gear set, wherein the first rotation element is a sun gear, the second rotation element is a planet carrier, and the third rotation element is a ring gear.

4. The power transmitting apparatus of claim 1, further comprising:
   a first clutch selectively connecting the engine to the first input shaft;
   a second clutch selectively connecting the engine to the second input shaft; and
   a third clutch selectively connecting the second input shaft to the third input shaft.

5. The power transmitting apparatus of claim 1, further comprising:
   the first output shaft disposed in parallel with the second and third input shafts;
   at least one speed gear engaged with the at least one input gear on the second input shaft or at least one speed gear engaged with the at least one input gear on the third input shaft, wherein the at least one speed gear engaged with the at least one input gear on the second input shaft and the at least one speed gear engaged with the at least one input gear on the third input shaft are rotatably disposed on the first output shaft;
   a first synchronizer disposed on the first output shaft and selectively connecting the at least one speed gear engaged with the at least one input gear on the second input shaft or the at least one speed gear engaged with the at least one input gear on the third input shaft to the first output shaft; and
   a first output gear fixedly disposed on the first output shaft and outputting torque of the first output shaft.

6. The power transmitting apparatus of claim 5, wherein the at least one speed gear engaged with the at least one input gear on the third input shaft comprises a first speed gear engaged with the third input gear and the at least one speed gear engaged with the at least one input gear on the second input shaft comprises a fourth speed gear engaged with the first input gear, and wherein the first speed gear and the fourth speed gear are rotatably disposed on the first output shaft.

7. The power transmitting apparatus of claim 1, further comprising:
   the second output shaft disposed in parallel with the second and third input shafts;
   at least one speed gear engaged with the second input gear on the second input shaft or at least one speed gear engaged with the fourth input gear on the third input shaft, wherein the at least one speed gear engaged with the second input gear on the second input shaft and the at least one speed gear engaged with the fourth input gear on the third input shaft are rotatably disposed on the second output shaft;
   a second synchronizer disposed on the second output shaft and selectively connecting the at least one speed gear engaged with the second input gear on the second input shaft to the second output shaft;
   a third synchronizer disposed on the second output shaft and selectively connecting the at least one speed gear engaged with the fourth input gear on the third input shaft to the second output shaft; and
   a second output gear fixedly disposed on the second output shaft and outputting torque of the second output shaft.

8. The power transmitting apparatus of claim 7, wherein the at least one speed gear engaged with the second input gear on the second input shaft comprises a second speed gear and the at least one speed gear engaged with the fourth input gear on the third input shaft comprises a reverse speed gear, and wherein the second synchronizer selectively connects the second speed gear or the reverse speed gear to the second output shaft.

9. The power transmitting apparatus of claim 7, wherein the at least one speed gear engaged with the fourth input gear on the third input shaft comprises a third speed gear and the third synchronizer selectively connects the third speed gear engaged with the fourth input gear to the second output shaft.

10. The power transmitting apparatus of claim 7, further comprising a reverse speed generator disposed in parallel with the second output shaft and adapted to achieve the reverse speed.

11. The power transmitting apparatus of claim 10, further comprising a reverse speed gear rotatably disposed on the second output shaft, and
wherein the reverse speed generator comprises:
an idle shaft disposed in parallel with the second output shaft; and
a reverse idle gear engaged to the third input gear on the third input shaft and to the reverse speed gear on the second output shaft.

12. The power transmitting apparatus of claim 1, further comprising a fourth clutch selectively connecting the first rotation element of the planetary gear set to the third input shaft.

13. The power transmitting apparatus of claim 1, wherein each of the second input shaft and the third input shaft is a hollow shaft, and
the first input shaft penetrates simultaneously through the second input shaft and the third input shaft.

14. A power transmitting apparatus for a vehicle comprising:
a first input shaft adapted to selectively receive torque of an engine;
a second input shaft adapted to selectively receive the torque of the engine, and having at least one input gear fixedly disposed thereon;
a third input shaft disposed in a row with the second input shaft, selectively connected to the second input shaft, and having at least one input gear fixedly disposed thereon;
a motor/generator operated as a motor or a generator;
a planetary gear set including a first rotation element directly connected to the motor/generator, a second rotation element directly connected to the third input shaft, and a third rotation element directly connected to the first input shaft;
a first clutch selectively connecting the engine to the first input shaft;
a second clutch selectively connecting the engine to the second input shaft;
a third clutch selectively connecting the second input shaft to the third input shaft;
a fourth clutch selectively connecting the first rotation element of the planetary gear set to the third input shaft;
a first output shaft receiving torque input from the second input shaft or the third input shaft;
a second output shaft receiving torque input from the second input shaft or the third input shaft; and
a reverse speed generator disposed in parallel with the second output shaft and adapted to achieve a reverse speed,
wherein the at least one input gear fixedly disposed on the second input shaft comprises a first input gear for achieving a fourth forward speed and a second input gear for achieving a second forward speed, and
the at least one input gear fixedly disposed on the third input shaft comprises a third input gear for achieving a first forward speed or a reverse speed and a fourth input gear for achieving a third forward speed.

15. The power transmitting apparatus of claim 14, wherein the planetary gear set is a single pinion planetary gear set, wherein the first rotation element is a sun gear, the second rotation element is a planet carrier, and the third rotation element is a ring gear.

16. The power transmitting apparatus of claim 14, further comprising:
the first output shaft disposed in parallel with the second and third input shafts;
a first speed gear engaged with the third input gear and rotatably disposed on the first output shaft;
a fourth speed gear engaged with the first input gear and rotatably disposed on the first output shaft;
a first synchronizer selectively connecting the first speed gear or the fourth speed gear to the first output shaft; and
a first output gear fixedly disposed on the first output shaft and outputting torque of the first output shaft.

17. The power transmitting apparatus of claim 14, further comprising:
the second output shaft disposed in parallel with the second and third input shafts;
a second speed gear engaged with the second input gear and rotatably disposed on the second output shaft;
a third speed gear engaged with the fourth input gear and rotatably disposed on the second output shaft;
a reverse speed gear rotatably disposed on the second output shaft;
a second synchronizer selectively connecting the second speed gear or the reverse speed gear to the second output shaft;
a third synchronizer selectively connecting the third speed gear to the second output shaft; and
a second output gear fixedly disposed on the second output shaft and outputting torque of the second output shaft.

18. The power transmitting apparatus of claim 17, wherein the reverse speed generator comprises:
an idle shaft disposed in parallel with the second output shaft; and
a reverse idle gear engaged to the third input gear on the third input shaft and the reverse speed gear on the second output shaft.

* * * * *